US012106085B2

United States Patent
Patil

(10) Patent No.: US 12,106,085 B2
(45) Date of Patent: Oct. 1, 2024

(54) DYNAMIC PERSONALIZED PLATFORM GENERATION BASED ON ON-THE-FLY REQUIREMENTS

(71) Applicant: KONINKLIJKE PHILIPS N.V., Eindhoven (NL)

(72) Inventor: Meru Adagouda Patil, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 116 days.

(21) Appl. No.: 17/784,950

(22) PCT Filed: Dec. 16, 2020

(86) PCT No.: PCT/EP2020/086326
§ 371 (c)(1),
(2) Date: Jun. 13, 2022

(87) PCT Pub. No.: WO2021/122675
PCT Pub. Date: Jun. 24, 2021

(65) Prior Publication Data
US 2023/0027179 A1    Jan. 26, 2023

Related U.S. Application Data

(60) Provisional application No. 62/950,411, filed on Dec. 19, 2019.

(51) Int. Cl.
*G06F 8/61* (2018.01)
*G06F 40/284* (2020.01)

(52) U.S. Cl.
CPC .............. *G06F 8/61* (2013.01); *G06F 40/284* (2020.01)

(58) Field of Classification Search
CPC ........................................................ G06F 8/61
(Continued)

(56) References Cited

U.S. PATENT DOCUMENTS 9,256,467 B1 *  2/2016  Singh ................... G06F 9/5077
10,171,377 B2 *  1/2019  Gao ..................... H04L 47/788
(Continued)

FOREIGN PATENT DOCUMENTS

JP      2020536321 A   *  9/2018
WO   WO-2018053717 A1  *  3/2018  ............... G06F 9/50
WO   WO-2021211911 A1  * 10/2021

OTHER PUBLICATIONS

K. Dolui and C. Kiraly, "Towards Multi-Container Deployment on IoT Gateways," 2018 IEEE Global Communications Conference (GLOBECOM), Abu Dhabi, United Arab Emirates, 2018, pp. 1-7.*
(Continued)

*Primary Examiner* — Francisco J Aponte

(57) ABSTRACT

A method (100) for installing a software package (38) on at least one computer (18) in which the software package has a container-based architecture and including a set (32) of containers (34) includes: providing a user interface (UI) (28) via which a use specification (30) is received from a user; identifying a subset of the set of containers based at least in part on comparing the received use specification with descriptors of the containers of the set of containers; computing resource requirements for the containers of the subset; and displaying at least one of (i) a list (36) of the containers of the subset and (ii) the computing resource requirements for the containers of the subset.

20 Claims, 3 Drawing Sheets

(58) Field of Classification Search
USPC .......................................................... 717/174
See application file for complete search history.

(56) References Cited

U.S. PATENT DOCUMENTS

| | | | | |
|---|---|---|---|---|
| 10,776,686 | B1* | 9/2020 | Jacob | G06N 3/08 |
| 10,868,717 | B2* | 12/2020 | Hariharan | H04L 41/0843 |
| 11,016,794 | B2* | 5/2021 | Jain | G06F 9/5044 |
| 11,113,090 | B1* | 9/2021 | Wilkinson | G06F 9/5077 |
| 11,296,902 | B2* | 4/2022 | Yarvis | H04L 67/60 |
| 11,334,333 | B1* | 5/2022 | Malvankar | G06F 9/44505 |
| 11,520,634 | B2* | 12/2022 | Zhang | G06F 9/505 |
| 11,556,315 | B2* | 1/2023 | Fontecilla | G06F 3/0481 |
| 11,693,669 | B2* | 7/2023 | Kamath | G06F 9/5044 713/1 |
| 11,748,164 | B2* | 9/2023 | Zhang | G06F 9/5005 718/104 |
| 11,861,221 | B1* | 1/2024 | Richardson | G06F 3/0659 |
| 2016/0205518 | A1* | 7/2016 | Patel | H04L 41/0895 455/518 |
| 2017/0213156 | A1 | 7/2017 | Hammond | |
| 2018/0062908 | A1* | 3/2018 | Rachamadugu | G06F 9/45558 |
| 2018/0123904 | A1* | 5/2018 | Thakrar | H04L 47/78 |
| 2018/0205616 | A1* | 7/2018 | Liu | G06F 8/20 |
| 2018/0213132 | A1 | 7/2018 | Liao | |
| 2018/0300499 | A1* | 10/2018 | Agarwal | G06F 8/60 |
| 2018/0357552 | A1 | 12/2018 | Campos | |
| 2019/0042988 | A1 | 2/2019 | Brown | |
| 2019/0197178 | A1* | 6/2019 | Agrawal | G06F 16/285 |
| 2019/0354389 | A1 | 11/2019 | Du | |
| 2020/0012743 | A1* | 1/2020 | Tucker | H04L 67/60 |
| 2020/0073717 | A1* | 3/2020 | Hari | G06F 9/5061 |
| 2020/0304526 | A1* | 9/2020 | Abraham | G06F 21/577 |
| 2020/0412769 | A1* | 12/2020 | Yi | H04L 63/205 |
| 2021/0319360 | A1* | 10/2021 | Vishnoi | G06N 5/043 |
| 2022/0109611 | A1* | 4/2022 | Bitterfeld | H04L 43/08 |
| 2022/0124009 | A1* | 4/2022 | Metsch | G06Q 10/087 |
| 2022/0171648 | A1* | 6/2022 | Rodriguez | G06F 9/4401 |
| 2023/0239209 | A1* | 7/2023 | Diamantopoulos | H04L 41/082 709/226 |
| 2023/0252592 | A1* | 8/2023 | Cella | H02J 3/381 705/35 |
| 2023/0305869 | A1* | 9/2023 | Traeger | G06F 9/45541 |
| 2023/0315421 | A1* | 10/2023 | Picco | G06F 9/45558 717/168 |
| 2023/0315489 | A1* | 10/2023 | Kamath | G06F 9/5077 713/1 |

OTHER PUBLICATIONS

W. Zheng et al., "Target-based Resource Allocation for Deep Learning Applications in a Multi-tenancy System," 2019 IEEE High Performance Extreme Computing Conference (HPEC), Waltham, MA, USA, 2019, pp. 1-7.*

Y. Hu, C. De Laat and Z. Zhao, "Multi-objective Container Deployment on Heterogeneous Clusters," 2019 19th IEEE/ACM International Symposium on Cluster, Cloud and Grid Computing (CCGRID), Larnaca, Cyprus, 2019, pp. 592-599.*

PCT International Search Report, International application No. PCT/EP2020/086326, Mar. 30, 2021.

Goodfellow I. et al., "Deep Learning Book", The MIT Press Book, 2016. http://www.deeplearningbook.org/.

"MLOps: Model Management, Deployment, Lineage, and Monitoring with Azure Machine Learning", Microsoft Learn, 2022 https://docs.microsoft.com/en-us/azure/machine-learning/service/concept-model-management-and-deployment.

Sivasubramanian S. et al., "AWS Machine Learning Blog, Welcome to the New AWS AI Blog", PERMALINK, Feb. 2017. https://aws.amazon.com/blogs/machine-learning/welcome-to-the-new-aws-ai-blog/.

* cited by examiner

DYNAMIC PERSONALIZED PLATFORM GENERATION BASED ON ON-THE-FLY REQUIREMENTS

CROSS-REFERENCE TO PRIOR APPLICATIONS

This application is the U.S. National Phase application under 35 U.S.C. § 371 of International Application No. PCT/EP2020/086326, filed on Dec. 16, 2020, which claims the benefit of U.S. Provisional Patent Application Ser. No. 62/950,411, filed on Dec. 19, 2019. These applications are hereby incorporated by reference herein.

FIELD

The following relates generally to the software package installation arts, container-based computing architecture arts, operating system (OS) level virtualization arts, artificial intelligence (AI) arts, AI-platform arts, AI container selection arts, and related arts.

BACKGROUND

The development of AI-based solutions is increasing day by day. However, the field of AI is very broad, and can be classified in multiple ways. In one example, AI solutions can be classified according to level (e.g., deep-learning, multi-layer perceptron (MLP), shallow autoencoders, representative learning, logistic regression, machine learning (ML), knowledge bases, and so forth). A second classification of AI can be based on the application on the type of data. For example, an AI application on numeric data can be classified as "data analysis", whereas AI application that processes a text data can be classified as "text analysis". These areas can be further classified. For example, "data analysis" can be "Statistical data analysis" or "Machine learning based data analysis". This field is divergent in the form of application but converges to one sub-technology of AI based on input data. A third classification of AI can be based on a type of problem it is trying to solve (e.g., a vision related problem, speech problem, an image processing issue, a transaction related issue, among others). Based on type of problem it is trying to solve, the underlying technologies vary. For vision related problems, deep learning based Convolutional Neural Network (CNN) methodologies have proven to be best fit to solve the problem. For transaction-related problems like classification of genuine vs. spurious financial transactions, ML techniques are more effective. Again, AI technologies are diverse, but few techniques suit a wide range of types of problems. Rather, a given problem is likely to leverage only a small subset of an available set of AI tools.

Similarly, a context and content of AI technologies can vary based on need of underlying environment. Typically, there are four different environments which are needed during AI based solution development: Developmental environment, Development-operations (Dev-OPS) environment, Testing Environment and Scoring Environment. Again, based on these environments, the technologies or packages needed vary. For example, in the Developmental environment, integrated development environments (IDEs) support is must for data scientists to develop their solutions, however for the Scoring environment, the IDEs are no needed as in this environment the given script needs to be executed and outcome should be returned to a caller, or stored at defined storage.

As indicated by these examples, there is a need to support all of these different classifications and environments as part of a comprehensive AI platform. Examples of such platforms include, for example, the PowerAI Platform (available from IBM, Armonk, New York, USA); the Azure-Machine Learning Service (available from Microsoft Corp., Redmond, Washington, USA); the Amazon Web Services (AWS) AI Service (available from Amazon, Seattle, Washington); the HealthSuite Insights Platform (available from Koninklijke Philips N.V., Eindhoven, the Netherlands), among others.

These platforms include different layers for different AI purposes, and each layer has multiple entities. These entities are implemented as containers running under a container-based architecture which can run multiple isolated computing environments which are referred to herein as containers. These platforms are designed to cater to varied user needs, ranging from screening application to diagnosis and reporting application using images from different modalities. As each application is designed for particular purpose targeted to address particular clinical need, an interaction/dependency of one application on other is limited or non-existent.

Since a total number of containers in a comprehensive AI platform or other large-scale container-based platform is large, the platform is commonly implemented via cloud computing, with the platform provider hosting the platform on a cloud based service, and users accessing the cloud-based platform using cloud technology to cater to unlimited required resources virtually. However, this is not an optimal solution for some users. A user of a cloud-based platform may have to pay for access to the entire platform, even though the user may only utilize a small portion of the platform. In addition, a user's access to the cloud-based platform may be hindered by Internet connectivity issues. The cloud-based platform may also have poor interconnectivity with local resources (e.g. local databases) that are to be used in a specific end-user application. Moreover, cloud-based platforms can introduce data security concerns for users who deal with confidential or sensitive data. In some applications, such data cannot be exposed to a cloud environment. Even if a cloud-based platform is permitted for a particular user application, data security breaches can adversely impact the end user; yet, the end user does not have control over the data security measures implemented (or not implemented) at the cloud-based platform. For example, a hospital handling patient medical data may store the patient medical data in encrypted form on its own servers. But, that data will generally need to be decrypted before it is sent to a cloud-based server for AI diagnostic processing, since the cloud-based platform cannot process the encrypted data and the hospital is unlikely to be willing to provide the cloud-based server with the passwords/passkeys for decrypting the data at the server. A cloud-based platform may also be unusable for applications deployed in some geographical regions, such as an AI-based medical diagnosis system intended for deployment in a geographical region with intermittent or non-existent Internet connectivity.

The following discloses certain improvements to overcome these problems and others.

SUMMARY

In one aspect, a method for installing a software package on at least one computer in which the software package has a container-based architecture and including a set of containers includes: providing a user interface (UI) via which a use specification is received from a user; identifying a subset of the set of containers based at least in part on comparing the received use specification with descriptors of the containers of the set of containers; computing resource requirements for the containers of the subset; and displaying at least one of (i) a list of the containers of the subset and (ii) the computing resource requirements for the containers of the subset.

In another aspect, a non-transitory computer readable medium stores instructions executable by at least one electronic processor to perform a method for installing a software package having a container-based architecture and including a set of containers on at least one computer. The method includes: providing a UI via which a use specification is received from a user, the received use specification including a textual use specification component; performing natural language processing (NLP) on the textual use specification component to generate at least one vector of use specification tokens; performing NLP on textual descriptors of the containers to generate vectors of container descriptor tokens for containers of the set of containers; identifying a subset of the set of containers based comparing the received use specification with descriptors of the containers of the set of containers, the at least one vector of use specification tokens, and a comparison of the at least one vector of use specification tokens and the vectors of container descriptor tokens for the containers of the set of containers; computing resource requirements for the containers of the subset; and controlling a display device to display the computing resource requirements for the containers of the subset.

In another aspect, an apparatus for installing a software package on at least one computer in which the software package has a container-based architecture and including a set of containers is provided includes at least one electronic processor programmed to: provide a UI via which a use specification is received from a user; identify a subset of the set of containers based at least in part on comparing the received use specification with descriptors of the containers of the set of containers; and download the containers of the subset of containers from an Internet-based server to the at least one computer responsive to receipt of an installation approval via the user interface.

One advantage resides in providing an efficient system and method for downloading and installing a software package having a container-based architecture on a computer, including automatically selecting the subset of the containers of the software package for download and installation based on a use specification.

Another advantage resides in providing an efficient system and method for downloading and installing a software package having a container-based architecture on a computer, including automatically selecting the subset of the containers of the software package for download and installation based on textual content of a use specification.

Another advantage resides in providing an efficient system and method for downloading and installing a software package having a container-based architecture on a computer, including automatically selecting the subset of the containers of the software package for download and installation without reliance on a human domain expert who is knowledgeable about the architecture of the software package.

Another advantage resides in providing an efficient system and method for downloading and installing a software package having a container-based architecture on a computer, which is usable by an end-user unfamiliar with the software package architecture.

Another advantage resides in providing an AI platform with a reduced dependence on cloud technology.

Another advantage resides in providing an AI platform that can be deployed locally so as to avoid potentially compromising confidential or sensitive data.

Another advantage resides in providing an AI platform that can be deployed on a local computer having limited computing resources.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
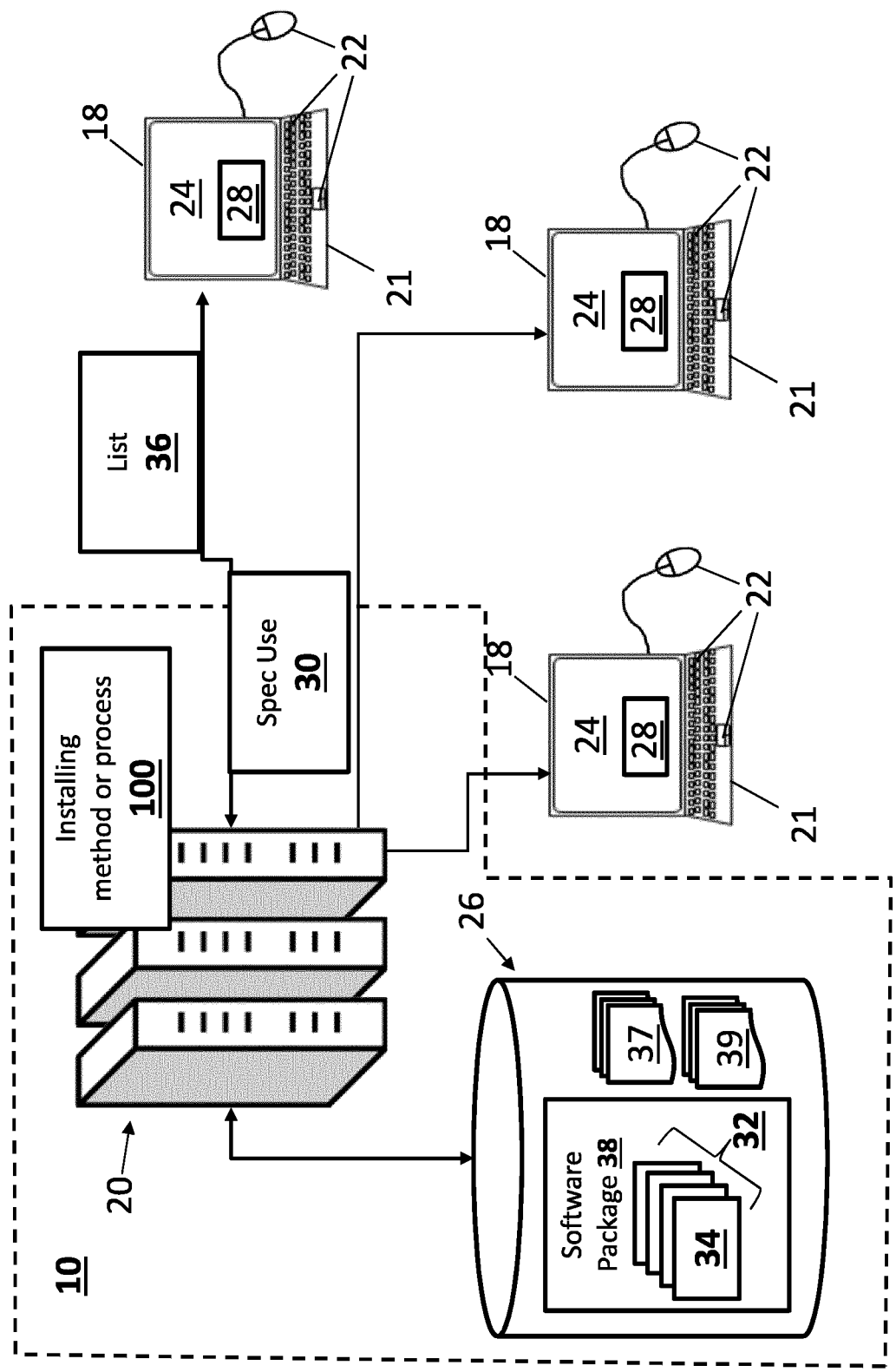
FIG. 1 diagrammatically illustrates an illustrative apparatus for installing a software package in accordance with the present disclosure.

The following relates generally to the area of (typically large-scale) computing platforms having a container-based architecture in which processing components are compartmentalized into containers. Each container is an isolated computing environment. In the illustrative embodiments, the container-based architecture is an operating system (OS) level virtualization architecture, which is similar to a virtual machine (VM) architecture except that all the containers are run by a single OS kernel (an approach known as OS level virtualization). Alternatively, the container-based architecture can employ containers implemented as fuller VM environments. The containers can intercommunicate using defined channels, thereby implementing a complex computing platform in a compartmentalized manner. Use of OS-level virtualization (as compared with a container-based architecture employing fuller VM environments with separate OS kernels) makes the containers more lightweight, as the container does not need to include the OS kernel itself.

As used herein, the term "container-based architecture" is intended to encompass OS-level virtualization architectures as well as container-based architectures that employ fuller VM environments. Some non-limiting examples of container-based architectures include: Docker platform (available from Docker, Inc.), in which the containers run on an open source Docker Engine (available for Linux and Windows); architectures employing Solaris Containers running under the Oracle Solaris OS or variants thereof; the open source OpenVZ platform; and the Microsoft Hyper-V platform (available from Microsoft Corporation). The containers of some container-based architectures may be referred to by other, platform-specific nomenclatures, e.g. containers are sometimes referred to as virtual environments (VEs) in OpenVZ, while containers are referred to as virtual machines (VMs) on the Hyper-V platform. The term "container" as used herein encompasses these variant nomenclatures.

A medical data processing platform can be installed and hosted locally on the hospital server or "local" cloud. Local hosting has some benefits such as more flexible/wider accessibility (e.g., accessible on a notebook computer linked to the hospital network via a VPN), and local control of data security (important when dealing with private patient data). However, local hosting of a comprehensive AI platform or other large-scale computing platform would be costly in terms of computing resources.

A container-based computing platform could alleviate this load in some instances. A given customer may actually use only a small subset of the containers that make up the computing platform. Due to the compartmentalized nature of the container-based computing platform, the local implementation could be provided by merely installing the OS kernel (e.g., the Docker Engine) on the local server, downloading those containers required by the customer, and running the downloaded containers on the OS kernel. In a fuller VM container-based architecture, only those containers (here VM environments) required by the customer would be downloaded and installed.

However existing container-based platforms do not provide an automated way for identifying the containers needed for a given customer. Hence, to provide a streamlined local implementation of the platform, a person knowledgeable about the computing platform at the container level would need to manually identify all containers needed to satisfy the customer requirements. Since the customer/end user typically does not have this specialized knowledge of the container-based platform, this approach would typically require contracting with the platform provider to provide the specialized knowledge needed to identify the containers required to implement the customer's intended application. Alternatively, the customer might attempt to manually select the containers for the intended use without specialized assistance; but this would likely involve extensive trial-and-error, and the resulting local implementation would likely be bloated by the user downloading more containers than are actually needed for the application.

In some embodiments disclosed herein, an approach is disclosed for automatically identifying the containers needed for a given customer, and the computing resources that would be needed to host those containers locally. This approach provides a user interface (preferably a graphical user interface, i.e. GUI) via which a user inputs a textual description of the customer requirements. The text input is analyzed to identify any additional information needed, and the user interface (UI) provides GUI dialogs to obtain the additional information. The customer requirements collected via the text input are processed using natural language processing (NLP) such a combination of continuous bag of words and skip gram techniques, and are augmented by GUI dialog-collected data to generate a structured representation of the customer requirements, for example formatted as a vector of tokens (e.g. words) $w_1, w_2, w_3, \ldots$.

Structured representations of each of the n containers that make up the computing platform are similarly constructed. In an illustrative approach, textual descriptions of the containers are taken from release notes or other natural language publications and formatted into a vector of tokens/words for each container. This may be augmented by other information mined from sources such as container configuration files (for example, dependencies between containers). This process also extracts the computing resources required for each container (usually listed in the release notes).

The structured representation of the customer requirements is then matched with the structured representations of the n containers in order to identify the subset of containers required to satisfy the customer requirements. This can be done by comparing overlap of the words/tokens in the customer requirements versus the words/tokens of the container descriptions. Container dependencies may also be leveraged: if Container A is a required container based on the matching, then any containers upon which Container A depends are also required containers. A list of the required containers and corresponding computing resources (e.g. memory footprint, CPU/GPU requirement) are output by the disclosed system for review by the user.

In a typical use scenario, a local installation of the computing platform is to be downloaded from a large-scale server provided by the platform vendor. The disclosed system can be implemented as a web page via which the user performs a local installation of the computing platform for a customer-specific task. The user inputs the customer requirements (i.e., use specification) via the web page (which serves as the GUI in this example), and the system automatically identifies a subset of the set of containers making up the platform which is sufficient to meet the customer requirements, and returns information such as the total computing resources required for the local installation (suitable for less sophisticated users), or a list of the required containers and the computing resources (i.e. system requirements) for locally hosting each of the required containers (suitable for a more sophisticated user who may want to know more precisely what is going to be installed). Optionally, if the web browser has information on the local system, the output may also include a warning if the local system has insufficient resources to host all the required containers. In addition, the output can include a cost of each container (or a total cost of all required containers). The user then reviews the displayed information, and approves the installation. Upon user approval, the required containers are downloaded to the local system and loaded into Docker Engine (or other OS kernel software under which the containers are designed to run).

This assumes that the OS kernel software is already installed. If the OS kernel software is not installed then the user may be prompted to install the OS kernel software as part of the installation process, or alternatively the installation process may automatically download and install the OS kernel software (assuming the OS kernel is open source or the vendor has appropriate software license rights to do so).

While a software package employing Docker containers running on the Docker engine is an illustrative example, the software package may in general employ any container-based architecture, such as: VMware Enterprise Container Infrastructure, which supports vSphere Integrated Containers; Solaris Containers running under Oracle Solaris OS; containers (sometimes referred to as VEs) running under the OpenVZ platform; containers (sometimes referred to as VMs) running on the Microsoft Hyper-V platform; or so forth.

With reference to FIG. 1, an illustrative software package distribution apparatus 10 is implemented on an electronic processor 20, such as a server computer or illustrative multiple server computers 20 (e.g., a server cluster or farm, a cloud computing resource, or so forth), which implements a method 100 for installing a software package 38 on at least one computer 18 (such as a notebook computer, or an illustrative workstation, or a local server computer or computer cluster with typically smaller storage capacity than the server computers 20, or so forth) as disclosed herein. The illustrative workstation 18 includes typical components, such as an electronic processor 21 (e.g., a microprocessor), at least one user input device (e.g., a mouse, a keyboard, a trackball, and/or the like) 22, and at least one display device 24 (e.g. an LCD display, plasma display, cathode ray tube display, and/or so forth). In some embodiments, the display device 24 can be a separate component from the workstation 18. The display device 24 may also comprise two or more display devices. The electronic processor 21 is operatively connected with the server computer(s) 20, typically by way of the Internet although a wide area network (WAN) or other type of electronic data network is contemplated, alone or in combination with an Internet connection. For example, the connection of the (local) computer 18 with the software package distribution apparatus 10 may be by way of an Internet connection made via a wired and/or wireless local area network (LAN) with a firewall. The software package distribution apparatus 10 further includes one or more non-transitory storage media 26 operatively connected with the server computer(s) 20. The non-transitory storage media 26 may, by way of non-limiting illustrative example, include one or more of a magnetic disk, RAID, or other magnetic storage medium; a solid state drive or other electronic memory; an optical disk or other optical storage; various combinations thereof; or so forth; and may be for example a network storage. It is to be understood that any reference to a non-transitory medium or media 26 herein is to be broadly construed as encompassing a single medium or multiple media of the same or different types. Likewise, the electronic processor 21 may be embodied as a single electronic processor or as two or more electronic processors.

The non-transitory storage media 26 stores instructions executable by the at least one electronic processor 21. The instructions include instructions to push a user interface (UI) 28, which is preferably although not necessarily a graphical user interface (GUI) 28 as illustrated, for display on the display device 24 of the local computer 18. This may be done in various ways. In one approach, the GUI 28 is provided as a web page displayed by a web browser (e.g., Mozilla Firefox, Google Chrome, Microsoft Edge or Internet Explorer, Apple Safari, or the like) running on the local computer 18. In this implementation, the electronic processing for producing the GUI 28 may be variously divided between the server computer(s) 20 and the local computer 18, ranging from in some embodiments a web page architecture in which the page is generated mostly or entirely at the server computer(s) 20 and sent in render-ready format to the web browser running on the local computer 18, to other embodiments in which the server computer(s) 20 push executable code (e.g. Java code, Javascript code, and/or so forth) which is executed at the local computer 18 to generate and render the GUI 28, to various intermediate approaches in which the server computer(s) 20 and local computer 18 variously share the load in generating the GUI 28. In the case of the local computer 18 onto which the software package is to be installed being a local server, the GUI 28 may be rendered on a workstation, notebook computer, or other electronic device that is operatively connected with the local server to provide the user input device(s) 22 and display device 24 for user interaction with the GUI 28.

The software package installation method 100 operates to install the software package 38 on the local computer 18. More particularly, the software package 38 has a container-based architecture and includes a set 32 of containers 34. In some illustrative examples, the software package 38 is a comprehensive AI platform, and the set 32 of containers 34 includes containers 34 for implementing a range of AI and other data analysis functions such as various types of classifiers, regression analyses, statistical analyses, text analyses, deep learning algorithms, knowledge bases, and so forth; along with containers for implementing a wide range of auxiliary functions such as user login, data entry, data presentation, graph generation, and so forth. It will be appreciated that the illustrative comprehensive AI platform may include dozens or hundreds or more containers—and consequently, installing the entire comprehensive AI platform would impose very high computing resource requirements on the computer 18 onto which it is to be installed. However, any given end-user application is likely to utilize only a small fraction of these dozens or hundreds or more containers. Hence, the software package installation method 100 operates to identify a subset of the set 32 of containers 34 that are required to perform the end-user application.

To perform the software package installation method 100, the electronic processor 20 and/or 21 is programmed to provide the GUI 28 to the computer 18. A user inputs a use specification 30 via the GUI 28. The use specification 30 includes, for example, a selection or entry of information describing the end-user application that the user wishes to perform. The use specification 30 may use some computer-specific terminology, such as specifying a type of programming language that is to be used (e.g., Python), information about the computer 18 on which the package is to be installed (e.g., whether it is running Linux, Windows, or so forth), classes of AI or other data processing algorithms (e.g., machine learning, classification, regression, statistical), and so forth. However, the use specification is not written in terms specific to the software package 38. For example, the use specification 30 will generally not identify specific containers of the software package 38. The use specification 30 may also include related information such as the number of users that are to be using the installed software package.

The use specification 30 can be entered via the at least one user input device 22 (e.g. as text via a keyboard, a selection of drop-down menus using a mouse, and so forth), and in the illustrative examples is entered (at least mostly) as free-form text. Once the use specification 30 is received, the electronic processor 20 matches the use specification 30 with descriptors 37 of the containers 34 to determine a subset of the containers that make up the software package 38 which are required to satisfy the use specification 30, along with resource requirements for (only) the required containers. The container descriptor or descriptors 37 used in the matching may, for example, include release notes for the containers, a technical and/or user manuals for the software package 38 that includes descriptions of the set 32 of containers 34 making up the software package 38, and/or so forth. The subset of the containers required for the user application may also be identified in part based on other information, such as container dependencies stored in container configuration files 39.

A list 36 of the required containers 34 (that is, a list of the subset of the set 32 of containers 34 that are identified based at least in part on the matching of the use specification 30 with the container descriptors 37) is displayed on the display device 24, along with the determined resource requirements. The user can choose which containers 34 to download. A software package 38 is created with the containers 34 and installed on the computer(s) 18. In another approach, which may be preferable for users who do not want to see details of what is being installed, the computing resource requirements for the containers of the identified subset are determined (that is, the aggregate total of the computing resource requirements for the entire subset) and only this is displayed for the user's consideration before the user decides whether to go forward with the installation. In another approach, which may be preferable for some users, nothing is displayed and instead the method 100 proceeds directly to the installation of the subset of containers on the computer 18.

The at least one electronic processor 20 is configured as described above to perform the method 100. The non-transitory storage medium 26 stores instructions which are readable and executable by the at least one electronic processor 20 (and possibly also by the electronic processor 21, for example to implement the GUI 28) to perform disclosed operations including performing the method or process 100.

Figure 2:
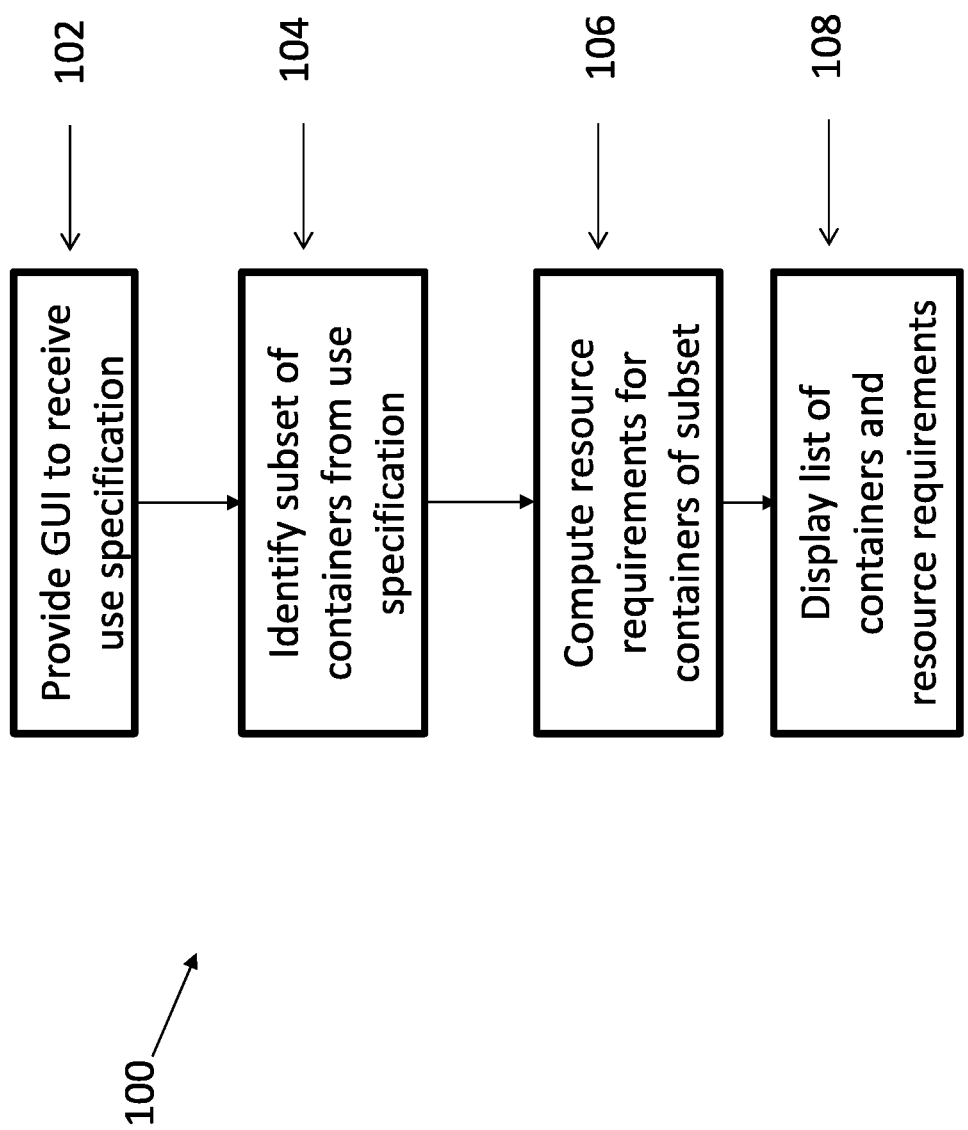
FIG. 2 shows example flow chart operations performed by the apparatus of FIG. 1.

With reference to FIG. 2, and with continuing reference to FIG. 1, an illustrative embodiment of method 100 is diagrammatically shown as a flowchart. At an operation 102, the server computer(s) 20 are programmed to provide the GUI 28 on the display device 24 of the computer 18. The GUI 28 is configured to receive the use specification 30 from the user.

At an operation 104, a subset of the set 32 of containers 34 making up the software package 38 is identified is based at least in part on in part on comparing the received use specification 30 with descriptors 37 of the containers 34 of the set 32 of containers. For example, the use specification 30 can include a textual use specification component. A natural language processing (NLP) algorithm is performed on the textual use specification component to generate at least one vector of use specification tokens. The subset of the set 32 of containers 34 is identified based at least on the at least one vector of use specification tokens. Additionally, or alternatively, the descriptors 37 of the containers 34 include textual descriptors of the containers, on which an NLP algorithm is performed to generate vectors of container descriptor tokens for the containers of the set of containers. The identifying of the subset of the set 32 of containers 34 is based at least on a comparison of the at least one vector of use specification tokens and the vectors of container descriptor tokens for the containers of the set of containers. The comparison can include comparing an overlap of the use specification tokens and the container descriptor tokens (e.g., using a cosine similarity metric). In some examples, the vectors of container descriptor tokens for the containers 34 of the set 32 of containers can be augmented with information extracted from container configuration 39 files for the containers of the set of containers.

In some more specific illustrative embodiments, a first subset of the set 32 of containers 34 can be identified by comparing the received use specification 30 with descriptors 37 of the containers 34 of the set 32 of containers. Container dependencies of the containers 34 of the first subset are extracted from configuration files 39 of the containers of the first subset. A second subset of the set 32 of containers 34 can be identified as one or more containers upon which the extracted container dependencies indicate the first subset of depends. The subset of the set 32 of containers 34 then includes a union of the first and second subsets. This process can be performed iteratively. For example, the container-dependencies for the second subset may identify a third subset which containers 34 of the second subset depend. The subset can then be a union of the first, second, and third subsets, and so on.

In some embodiments, one or more user dialogs can be identified and provided via the GUI 28 based on the textual user specification component of the use specification 30, which can receive user query responses. The identifying of the subset of the set 32 of containers 34 is further based on the user query responses.

At an operation 106, resource requirements are computed for the containers 34 of the subset. To do so, the computing resources for each container 34 are extracted from container configuration files 39 for the containers. In some examples, when the computed resources for the computer(s) 18 are determined to insufficient for the software package 38 to be downloaded, an indication can be output on the GUI 28 that the computer has insufficient resources.

At an operation 108, the list 36 of containers 34, which are annotated with the computing resources requirements, are displayed on the display device 24 of the computer 18. (Alternatively, only the total aggregate computing resources for all the containers of the identified subset is displayed, without, or in other embodiments with, the list of containers). The cost associated with each container 34 on the list 36 (or alternatively, an aggregate cost of each container on the list) can also be displayed. The GUI 28 can also include a user dialog for receiving an installation approval from the user to install the software package 38 comprising the containers 34 in the list 36. For example, the user dialog may include the text "Do you want to proceed with the installation?" or some similar text, along with mouse-clickable buttons labeled "Yes" or "No" respectively. If the user selects to install the software package 38 (e.g., clicks on the "Yes" button), then the containers 34 of the subset of containers are downloaded from the Internet-based server 20 to the computer (s) 18 at which the software package is to be installed. The downloaded containers 34 are linked with an OS kernel at the computer(s) 18 under which the containers are to run. For example, if the containers 34 are Docker containers, then the downloaded Docker containers are linked with the Docker Engine which serves as the OS kernel in this illustrative example. Prior to this linking, the server computer (s) 20 can determine whether the computer(s) 18 have the OS kernel installed thereon. If it is not, the OS kernel can either be automatically installed on the computer(s) 18, or the user can be prompted via the GUI 28 to install the OS kernel.

Figure 3:
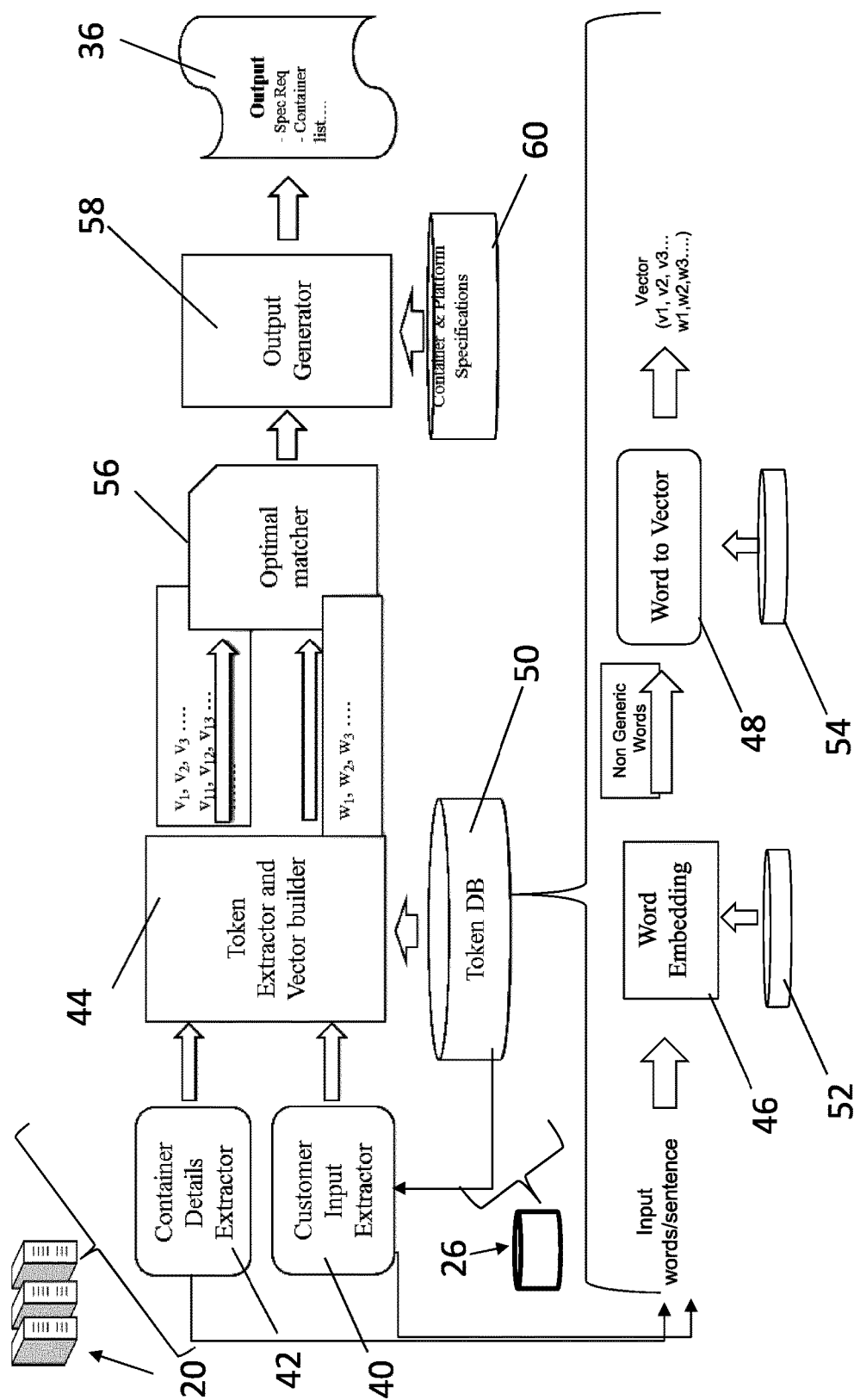
FIG. 3 shows an example of one or more software modules of the apparatus of FIG. 1.

FIG. 3 diagrammatically shows a more specific illustrative embodiment of one or more software modules or programs implemented in the server computers 20 to perform the method 100. As shown in FIG. 1, an input extractor 40 receives the use specification 30 and analyze the text data therein (or converts the use specification to text data for analysis). The text data is processed using, for example, a keyword aggregation algorithm to extract matching methodology key information. The key information can be used prompt the user to enter more precise information related to the use specification 30 (e.g., operating system (OS) requirements, cost requirements, and so forth). This additional information is combined with the key information and input to a token extractor and vector builder 44.

A container details extractor 42 receives the container descriptors 37, and uses the text data to extract details of each container 34. Such details can include, for example, a name of the container 34, keywords contained in a semantic textual description of the container given in release notes (or published to a user in any other format), and information from associated container configuration files 39 (stored in the non-transitory computer readable medium 26). The collected data is merged, cleaned, and formatted into the following sets of data: intended use (e.g., the primary usage of the container 34, if any, given the input data in the use specification 30), performance (a performance number of the container based on the use specification), and requirement (e.g., hardware configuration, CPU/GPU needs, dependence on other containers, and so forth). This data is also input to the token extractor and vector builder 44.

The token extractor and vector builder 44 processes the data from the input extractor 40 to generate one or more vectors ($v_1 \ldots v_{n_s}$) and the data from the container details extractor 42 to generate one or more ($w_1 \ldots w_{n_s}$) vectors. To do so, the token extractor and vector builder 44 includes a word embedder 46 which uses a frequency-based algorithm to eliminate the most frequently used words not specific to a given container subject from the data input from the input extractor 40 and the container details extractor 42. The generic words are removed, and the non-generic words are input to a word-to-vector generator 48. The word-to-vector generator 48 constructs one or more vectors using a "continuous bag of words" algorithm and a "skip-gram" algorithm. A continuous bag of words algorithm uses a negative log likelihood of a word given a set of context is computed according to, for example, Equation 1:

$$-\log\left(p\left(\frac{w_0}{w_i}\right)\right) \quad (1)$$

where $$p\left(\frac{w_0}{w_i}\right)$$

is given as shown in Equation 2:

$$p(w_O \mid w_I) = \frac{\exp(v'_{w_O}{}^\top v_{w_I})}{\sum_{w=1}^{W} \exp(v'_w{}^\top v_{w_I})} \quad (2)$$

where $w_o$ is a set of output words, and $w_1$ is a set of context words. In a skip-gram algorithm, a context is determined for a given word.

Both the word embedder 46 and the word-to-vector generator 48 utilize a token database 50 which stores a generic token database 52 (used by the word embedder 46) and a trained token database 54 (used by the word-to-vector generator 48). The generic token database 52 can be derived from public database that covers generic words or tokens such as: "the", "using", "is", "man", "people", "team", "size", "edit", "menu", "application program interface (API)", and so forth. The trained token database 54 can be built internally using specific words or tokens such as "data" "data scientists", "scoring" "model", "machine-learning", "analysis", "pruning", "support vector machine (SVM)", "decision tree", "classification": and so forth.

An optimal matcher 56 receives the sets of vectors ($v_1 \ldots v_{n_s}$) and ($w_1 \ldots w_{n_s}$) from the token extractor and vector builder 44. The vectors for different containers 34 can be represented as below in Table 1:

TABLE 1

| Container 1 | $V_{11}, V_{12}, V_{13}, \ldots$ |
|---|---|
| Container 2 | $V_{21}, V_{22}, V_{23}, \ldots$ |
| Container 3 | $V_{31}, V_{32}, V_{33}, \ldots$ |
| ... | ... |
| Container n | $V_{n1}, V_{n2}, V_{n3}, \ldots$ | while the vectors generated from processing of customer input can be represented as: $w_1, w_2, w_3, w_4, \ldots$.

Given these vectors, the optimal matcher 56 calculates or determines a similarity measure between different vectors using a cosine similarity given in Equation 3:

$$\theta = \bigcup_{i=1}^{n} \frac{v_i \cdot w}{\|v_i\| \|w\|} \quad (3)$$

where $\theta$ is similarity measure of the vectors, $v_i$ is vector list associated with container i, and w is vector list generated from customer input.

A list of vector sets that yield a "best union value" of the containers 34 is considered. All the vector sets that contribute in enhancing value of similarity measure are considered as valid vectors. For these selected vector sets corresponding container sets are marked as essential containers for given customer requirement indicated in the use specification 30. The list of vector sets is transmitted to an output generator 58.

The output generator 58 outputs the list 36 on the display device 24 of the computer 18. To generate the list 36, the output generator 58 retrieves details of the containers 34 that yield a best union value in the similarity matching stored in a container and platform specification database 60 (implemented in the non-transitory computer readable medium 26). The stored details of the containers 34 can include: memory footprint, minimum CPU/GPU requirement, minimum storage requirement, dependency on other containers/3rd party libraries, cost, and so forth. The output generator mines the container and platform specification database 60 to extract the relevant information. Similar entries in the retrieved data and from the output of the optimal matcher 56 are aggregated to arrive at aggregated values, while dissimilar entries values are marked as special requirements. These entries are used to generate the list 36. The list 36 can include the containers 34, access details of each container, hardware specifications needed for all containers, an aggregated memory requirement, a possible performance matric, a number of CPUs/GPUs, an aggregated cost, and so forth.

EXAMPLE

The following shows an example of the apparatus 10. In this example, a user or customer may be interested in installing a data science environment AI-platform for a team of ten scientists. The user can enter the use specification 30 in text (or dictation or other suitable entry method), such as "I would like to set up a data scientist environment for my data science team of size ten members". The input extractor 40 processes this text and dynamically generate other fields on the GUI 28 for the user to fill in in order to more accurately identify the appropriate container(s) 34. Such other fields can include a development environment field (e.g., R, Python, Both, and so forth); a data type field (e.g., numeric, text, image, video (4D), 1D signal, and so forth), a type of algorithm field (e.g., deep-learning (DL), ML, statistical modelling, and so forth). The user can select for example, developmental environment as both R and Python, while support is needed for numeric data processing and type of algorithms needed are ML and statistical modelling algorithms.

The containers 34 can include, for example, Workbench (which supports developmental environment with IDE for both R and Python); Scoring (which is used to score deployed models based on request); ML Services (which hosts all ML algorithms); natural language processing (NLP) Services (which hosts all NLP algorithms); DL Services (which hosts DL algorithms such as Keras, Caffe, and Tensorflow); Authentication services (which is used to allow control access of the environment); Rule-Based Engine Services (which is used for development of rule based models such DROOLs and Java Business Process Model (JBPM)), Storage Service (which helps in mounting and accessing given storage device for said accounts. This service needs Authentication services container as prerequisite), and so forth.

The container details extractor 42 extracts details of the containers 34, along with release notes data, to determine specific needs of AI algorithm development and scoring. Typical release notes of the containers 34 are shown below.

---

Score Service:

A set of API's used for scoring using a script deployed through workbench.

- Scoring Status API for a non-existent TaskId will always return 'PENDING'
- Scoring result API for a non-existent TaskId will always return 'Job is still executing, can not fetch the result'
- Score service API is currently Asynchronous and not Synchronous.
- Terminate Scoring API for a non-existent TaskId will always return 'Terminated successfully'
- Scoring result API will return a json output only if the script calls AMPSetResult( ) of ML SDK or if the user explicitly saves the output of the script in the current directory with the name customscore.json
- Currently, scoring service does not allow parallel execution and the tasks would get executed sequentially in the order they are triggered.

---

Workbench:

The HealthSuite Insights Workbench is a collaborative development environment for the creation of new analytic models for use by data scientists, software developers and healthcare providers

- On invalid login attempt, workbench does not throw proper error message and instead takes user to login screen.
- Edit script description is throwing up error, and description update for the scripts will not work.
- If a user has an existing JDBC connection profile/credential file, he needs to recreate the file using Data Source menu of HSI by providing the details again.
- Workbench has the capability to open a iPython notebook in a separate Jupyter Hub notebook. But, it does not open files with just .R or .py extensions.

---

NLP Service:

NLP Service provides the following building blocks for text analytics:

- Tokenizers: Tokenizes a given text into words, sentences and sections.
- Clinical text taggers: Part-of-speech tagging, named entity recognition and anatomy tagging.
- Measurement detection: Identify measurements in clinical text.
- Negation detection: Identify negated entities

---

ML Service:

Host of generic Machine learning algorithms (e.g. Classification, regression, clustering, etc.) for training predictive models
List of SDK's API's that are in beta phase:

- Modeling
  - Maximum likelihood estimation
  - Generic Models
  - K-nearest neighbour
- Data preparation
  - Table Match
  - Smote
- Evaluation
  - Generic model status
  - Generic model summary

---

The token extractor and vector builder 44 can extract the following tokens from the input extractor 40: "Data Science Environment", "R", "Python", "team", "members", "Numeric data type", "Machine Learning Algorithms", "Statistical Modelling", "Statistical Modelling Algorithm", and so forth. The token extractor and vector builder 44 can also extract the following tokens from the details extracted from the container details extractor 42: Workbench: "IDE", "R", "Python", "user", "login screen", "Jupyter Hub notebook", "Edit script", and so forth; Scoring: "Scoring", "deployed models", "Asynchronous", "TaskId", "result", "json", "output", . . . and so forth; ML Services: "Machine learning", "algorithms", "Classification", "Regression", "Modeling", "Data Preparation", "Evaluation", . . . and so forth; NLP Services: "text analysis", "Tokenizers", "Part-of-speech", "named entity recognition", "clinical text", negation detection", . . . and so forth; DL Services: "Keras", "Caffe", "Tensorflow", "CNN", "RNN", "Relu", . . . and so forth; Authentication Services: "login", "access", "user", "account", "authentication", "password", . . . and so forth; Rule based engine Services: "Rule engine", "DROOLS", "JBPM", "Java", "ME", "forward and backward chaining", . . . and so forth; and Storage Service: "Mounting", "Storage media", "account", "ext", "NTFS", "shared storage", "permission", . . . and so forth.

From the extracted tokens, the token extractor and vector builder 44 generates vectors as shown in Table 2:

TABLE 2

| Entity Details | Vectors |
|---|---|
| Customer | D + S + E, R, P, T, M, N + D + T, |
| Input | M + L + A, S + M + A, . . . |
| Workbench | I, R, P,U, L + S, J + H + N, E + S, . . . |
| Scoring | S, D + M, A, Ti, R, J, O, . . . |
| ML Services | M + L, A, C, R, Md, D + P, E, . . . |
| NLP Services | T + A, Tk, PoS, NER, Cl + T, N + D, . . . |
| DL Services | K, C, Tf, Cnn, Rnn, Re |
| . . . | . . . |

Some of these vectors can be similar (i.e., parallel in direction, and other vectors can be dissimilar (i.e., perpendicular in direction, or oriented differently). The optimal matcher 56 then uses the cosine similarity metric (e.g., Equation 3) to generate a list of parallel vectors. These vectors are selected and mapped back. For example, R and P vectors of Customer Input are same as of Workbench. Similarly, D+S+E vector matches with I and L+S combined. The other vectors that match perfectly are M+L+A of customer input with M+L vector in addition with A. A certain number of vectors (i.e., top ten) are selected. The container(s) 34 that carry these vectors are in turn selected as candidate containers. Such candidate containers include Workbench, ML Services, and Authentication Services.

The output generator 58 uses these candidate containers are used to generate the list 36, in addition to detailed hardware requirement specification and costing details, as shown in Table 3:

TABLE 3

| Container Name | H/W and S/W Requirement | Cost |
|---|---|---|
| Work bench | 10 × i5 processor equivalent 64 GB RAM, 100 GB Storage | 120 K€/year |
| ML Services | 10 × i5 processor equivalent 128 GB RAM | 256 K€/year |
| Authentication Services | LDAP accounts | 87 K€/year |

Similarly, a platform dealing with clinical applications can be personalized based on on-the-fly requirements from the customer.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for installing a software package on at least one computer, the software package having a container-based architecture and including a set of containers, the method comprising:
   providing a user interface (UI) via which a use specification is received from a user, wherein the received use specification includes a textual use specification component;
   identifying a subset of the set of containers based at least in part on comparing the received use specification with descriptors of the containers of the set of containers, wherein the descriptors of the containers include textual descriptors of the containers;
   computing resource requirements for the containers of the subset; and
   displaying the computed resource requirements for the containers of the subset;
   wherein the identifying the subset includes:
      performing natural language processing (NLP) on the textual use specification component to generate at least on vector of use specification tokens; and
      identifying the subset of the set of containers based at least on the at least one vector of use specification tokens by comparing an overlap of the use specification tokens and the container descriptor tokens.

2. The method of claim 1, further comprising:
   after the displaying and responsive to receipt of an installation approval via the user interface, downloading the container of the subset of containers from an Internet-based server to the at least one computer; and
   linking the downloaded containers with an operating system (OS) kernel at the at least one computer under which the containers are to run.

3. The method of claim 2, further comprising: prior to the linking, determining that the OS kernel is not installed on the at least one computer and one of (i) automatically installing the OS kernel on the at least one computer or (ii) prompting the user to install the OS kernel on the at least one computer.

4. The method of claim 1, wherein the identifying of the subset includes: performing natural language processing (NLP) on the textual descriptors of the containers to generate vectors of container descriptor tokens for the containers of the set of containers; and identifying the subset of the set of containers based at least on a comparison of the at least one vector of use specification tokens and the vectors of container descriptor tokens for the containers of the set of containers.

5. The method of claim 4, further comprising: augmenting the vectors of container descriptor tokens for the containers of the set of containers with information extracted from container configuration files for the containers of the set of containers.

6. The method of claim 3, further including:
   based on the textual use-specification component, identifying one or more user query dialogs;
   providing, via the UI, the one or more user query dialogs and receiving user query responses via the provided one or more user query dialogs;
   wherein the identifying of the subset of the set of containers is further based on the user query responses.

7. The method of claim 1, further including:
   extracting at least one computing resources required for each container from container configuration files for the containers of the set of containers and a cost associated with each container;
   wherein the displaying includes displaying the list of the containers of the subset annotated by at least one of the computing resource requirements for each container of the subset and the cost associated with each container.

8. The method of claim 1, wherein the identifying of the subset of the set of containers includes:
   identifying a first subset of the set of containers by comparing the received use specification with descriptors of the containers of the set of containers;
   extracting container dependencies of the containers of the first subset from configuration files of the containers of the first subset; and
   identifying a second subset of the set of containers as one or more containers upon which the extracted container dependencies indicate the first subset of depends;
   wherein the subset of the set of containers includes the union of the first subset and the second subset.

9. A non-transitory computer readable medium storing instructions executable by at least one electronic processor to perform a method for installing a software package having a container-based architecture and including a set of containers on at least one computer, the method including:
providing a user interface (UI) via which a use specification is received from a user, wherein the received use specification includes a textual use specification component;
identifying a subset of the set of containers based at least in part on comparing the received use specification with descriptors of the containers of the set of containers; wherein the descriptors of the containers include textual descriptors of the containers;
computing resource requirements for the containers of the subset; and
controlling a display device to display the computed resource requirements for the containers of the subset;
wherein identifying of the subset includes:
performing natural language processing (NLP) on the textual use specification component to generate at least one vector of use specification tokens;
performing NLP on the textual descriptors of the containers to generate vectors of container descriptor tokens for containers of the set of containers; and
identifying the subset of the set of containers based at least on a comparison of the at least one vector of use specification tokens and the vectors of container descriptor tokens for the containers of the set of containers; and
wherein the non-transitory computer readable medium does not include a transitory computer readable medium.

10. The non-transitory computer readable medium of claim 9, wherein the method further includes:
after the displaying and responsive to receipt of an installation approval via the user interface, downloading the containers of the subset of containers from an Internet-based server to the at least one computer; and
linking the downloaded containers with an operating system (OS) kernel at the at least one computer under which the containers are to run.

11. The non-transitory computer readable medium of claim 10, wherein the method further includes: prior to the linking, determining that the OS kernel is not installed on the at least one computer and one of (i) automatically installing the OS kernel on the at least one computer or (ii) prompting the user to install the OS kernel on the at least one computer.

12. The non-transitory computer readable medium of claim 10, wherein the method further includes identifying the subset of the set of containers by: comparing an overlap of the use specification tokens and the container descriptor tokens.

13. The non-transitory computer readable medium of claim 9, wherein the method further includes identifying the subset of the set of containers by:
identifying a first subset of the set of containers by comparing the received use specification with descriptors of the containers of the set of containers;
extracting container dependencies of the containers of the first subset from configuration files of the containers of the first subset; and
identifying a second subset of the set of containers as one or more containers upon which the extracted container dependencies indicate the first subset of depends;
wherein the subset of the set of containers includes the union of the first subset and the second subset.

14. The non-transitory computer readable medium of claim 9, wherein the method further includes:
based on the textual user specification component, identifying one or more user query dialogs;
providing, via the UI, the one or more user query dialogs and receiving user query responses via the provided one or more user query dialogs; and
wherein the identifying of the subset of the set of containers is further based on the user query responses.

15. The non-transitory computer readable medium of claim 9, wherein the method further includes: extracting computing resources required for each container from container configuration files for the container of the set of containers.

16. The non-transitory computer readable medium of claim 9, wherein the method further includes:
identifying computing resources of the at least one computer on which the software package is to be installed;
determining that the computing resources of the at least one computer on which the software package is to be installed are insufficient to meet the computing resource requirements for the containers of the subset; and
responsive to the determining, outputting, via the UI, an indication that the at least one computer has insufficient resources to install the software package.

17. A method for installing a software package on at least one computer, the software package having a container-based architecture and including a set of containers, the method comprising:
providing a user interface (UI) via which a use specification is received from a user, wherein the received use specification includes a textual use specification component;
identifying a subset of the set of containers based at least in part on comparing the received use specification with descriptors of the containers of the set of containers, wherein the descriptors of the containers include textual descriptors of the containers;
computing resource requirements for the containers of the subset; and
displaying the computed resource requirements for the containers of the subset;
wherein identifying the subset includes:
performing natural language processing (NLP) on the textual use specification component to generate at least one vector of use specification tokens;
performing NLP on the textual descriptors of the containers to generate vectors of container descriptor tokens for the containers of the set of containers; and
identifying the subset of the set of containers based at least on a comparison of the at least one vector of use specification tokens and the vectors of container descriptor tokens for the containers of the set of containers.

18. The method of claim 17, further comprising: augmenting the vectors of container descriptor tokens for the containers of the set of containers with information extracted from container configuration files for the containers of the set of containers.

19. The method of claim 17, further comprising:
after the displaying and responsive to receipt of an installation approval via the user interface, downloading the container of the subset of containers from an Internet-based server to the at least one computer; and linking the downloaded containers with an operating system (OS) kernel at the at least one computer under which the containers are to run.

20. The method of claim 19, further comprising: prior to the linking, determining that the OS kernel is not installed on the at least one computer and one of (i) automatically installing the OS kernel on the at least one computer or (ii) prompting the user to install the OS kernel on the at least one computer.

* * * * *